United States Patent
Ma et al.

(10) Patent No.: US 12,156,156 B2
(45) Date of Patent: *Nov. 26, 2024

(54) TIMING OFFSET SELECTION IN NON-TERRESTRIAL NETWORK

(71) Applicant: QUALCOMM Incorporated, San Diego, CA (US)

(72) Inventors: Liangping Ma, San Diego, CA (US); Xiao Feng Wang, San Diego, CA (US); Alberto Rico Alvarino, San Diego, CA (US); Umesh Phuyal, San Diego, CA (US); Jun Ma, San Diego, CA (US); Changhwan Park, San Diego, CA (US); Ayan Sengupta, San Diego, CA (US); Juan Montojo, San Diego, CA (US); Peter Gaal, San Diego, CA (US); Wanshi Chen, San Diego, CA (US); Bharat Shrestha, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/451,360

(22) Filed: Aug. 17, 2023

(65) Prior Publication Data
US 2023/0397140 A1 Dec. 7, 2023

Related U.S. Application Data

(63) Continuation of application No. 17/653,715, filed on Mar. 7, 2022, now Pat. No. 11,895,608, which is a
(Continued)

(51) Int. Cl.
*H04W 56/00* (2009.01)
*H04L 1/08* (2006.01)
(Continued)

(52) U.S. Cl.
CPC ............. *H04W 56/004* (2013.01); *H04L 1/08* (2013.01); *H04L 1/1812* (2013.01); *H04W 72/23* (2023.01)

(58) Field of Classification Search
CPC ... H04W 28/04; H04W 72/04; H04W 72/042; H04W 88/08; H04W 56/004; H04W 72/23; H04L 5/0007; H04L 1/08; H04L 1/1812
(Continued)

(56) References Cited

U.S. PATENT DOCUMENTS 7,133,377 B1 11/2006 Mullins et al.
2016/0100422 A1 4/2016 Papasakellariou et al.
(Continued)

FOREIGN PATENT DOCUMENTS

CN 112601277 A 4/2021
CN 112804745 A 5/2021
(Continued)

OTHER PUBLICATIONS

3GPP TSG RAN WG1 Meeting #: 102-e, E-meeting, Aug. 17-28, 2020, R1-2005265, Agenda item: 8.4.1, Source: Huawei, HiSilicon, Title: Discussion on timing relationship enhancements for NTN. (Year: 2020).*
(Continued)

*Primary Examiner* — Peter G Solinsky
*Assistant Examiner* — Sanjay K Dewan
(74) *Attorney, Agent, or Firm* — Harrity & Harrity, LLP

(57) ABSTRACT

Various aspects of the present disclosure generally relate to wireless communication. In some aspects, a user equipment (UE) may receive, from a non-terrestrial network (NTN) entity, a message that is associated with an uplink grant. The UE may select, based at least in part on the message, either a cell-specific offset or an updated offset that is indicated
(Continued)

after initial access, as a timing offset that accounts for a propagation delay between a base station of the NTN and the UE. The UE may transmit, to the NTN entity, an uplink communication using the timing offset. Numerous other aspects are described.

30 Claims, 10 Drawing Sheets

Related U.S. Application Data continuation of application No. 17/449,507, filed on Sep. 30, 2021.

(60) Provisional application No. 63/187,314, filed on May 11, 2021.

(51) Int. Cl.
*H04L 1/1812* (2023.01)
*H04W 72/23* (2023.01)

(58) Field of Classification Search
USPC .......................................................... 370/329
See application file for complete search history.

(56) References Cited

U.S. PATENT DOCUMENTS

| | | | |
|---|---|---|---|
| 2016/0150570 A1 | 5/2016 | Wang et al. | |
| 2016/0198361 A1 | 7/2016 | Sun et al. | |
| 2017/0150367 A1* | 5/2017 | Han | H04L 27/0006 |
| 2018/0310321 A1 | 10/2018 | Basu Mallick et al. | |
| 2019/0097762 A1 | 3/2019 | Jeon et al. | |
| 2019/0349964 A1 | 11/2019 | Liou | |
| 2019/0377894 A1 | 12/2019 | Jang | |
| 2020/0029292 A1 | 1/2020 | Zou et al. | |
| 2020/0267750 A1 | 8/2020 | Park et al. | |
| 2020/0313808 A1 | 10/2020 | Lee et al. | |
| 2020/0314914 A1 | 10/2020 | Roy et al. | |
| 2020/0328849 A1 | 10/2020 | Noh et al. | |
| 2021/0014931 A1 | 1/2021 | Noh et al. | |
| 2021/0044391 A1 | 2/2021 | Lunttila et al. | |
| 2021/0051736 A1* | 2/2021 | Jeon | H04W 76/11 |
| 2021/0058805 A1 | 2/2021 | Ji et al. | |
| 2021/0099933 A1* | 4/2021 | Matsuda | H04W 36/0072 |
| 2021/0105693 A1 | 4/2021 | Tripathi et al. | |
| 2021/0105731 A1 | 4/2021 | Lin | |
| 2021/0119861 A1 | 4/2021 | Tripathi et al. | |
| 2021/0168895 A1 | 6/2021 | Sha et al. | |
| 2021/0185652 A1 | 6/2021 | Rune | |
| 2021/0250781 A1* | 8/2021 | Dang | H04B 7/0408 |
| 2021/0289460 A1 | 9/2021 | Medles et al. | |
| 2021/0297149 A1 | 9/2021 | Hsieh et al. | |
| 2021/0352735 A1 | 11/2021 | Bae et al. | |
| 2022/0078856 A1 | 3/2022 | Jeon et al. | |
| 2022/0110184 A1 | 4/2022 | Jeon et al. | |
| 2022/0140949 A1 | 5/2022 | Kim | |
| 2022/0232504 A1 | 7/2022 | Cozzo et al. | |
| 2022/0322414 A1 | 10/2022 | Khoshkholgh Dashtaki et al. | |
| 2022/0369255 A1 | 11/2022 | Ma et al. | |
| 2022/0369256 A1 | 11/2022 | Ma et al. | |

FOREIGN PATENT DOCUMENTS

| | | | |
|---|---|---|---|
| CN | 113630863 A | 11/2021 | |
| CN | 114337772 A | 4/2022 | |
| CN | 114650563 A | 6/2022 | |
| CN | 115066942 A | 9/2022 | |
| WO | 2012041422 A2 | 4/2012 | |
| WO | WO 2021/033094 A1 * | 2/2021 | H04B 7/185 |
| WO | 2021063395 A1 | 4/2021 | |
| WO | 2022155177 A1 | 7/2022 | |

OTHER PUBLICATIONS

Huawei, et al., "Discussion on Timing Relationship Enhancements for NTN", 3GPP TSG RAN WG1 Meeting #102-e, R1-2005265, Agenda Item: 8.4.1, 3rd Generation Partnership Project, Mobile Competence Centre, 650, Route Des Lucioles, F-06921 Sophia-Antipolis Cedex, France, vol. RAN WG1, No. E-meeting, Aug. 17, 2020-Aug. 28, 2020, Aug. 8, 2020, XP051917313, 6 Pages.
International Search Report and Written Opinion—PCT/US2022/071291—ISA/EPO—Jul. 11, 2022.
Nokia et al., "2-Step RACH Procedure Feature Lead Summary", R1-1907726, 3GPP TSG RAN WG1 #97, 2-STEP RACH Procedure Feature Lead Summary RAN1#97, 3rd Generation Partnership Project, Mobile Competence Centre, 650, Route Des Lucioles, F-06921 Sophia-Antipolis Cedex, vol. RAN WG1, No. Reno, USA, May 13, 2019-May 17, 2019, May 16, 2019, XP051740005, 53 pages, Agenda Item: 7.2.1.2, Chapter 3.3.
Nokia, et al., "Discussion on Time Relations for NTN Operation", 3GPP TSG RAN WG1 #104bis, R1-2103669, Agenda Item: 8.4.1, 3rd Generation Partnership Project, Mobile Competence Centre, 650, Route Des Lucioles, F-06921 Sophia-Antipolis Cedex, France, vol. RAN WG1, No. E-Meeting, Apr. 12, 2021-Apr. 20, 2021 Apr. 6, 2021, XP051993468, 6 Pages.

* cited by examiner

TIMING OFFSET SELECTION IN NON-TERRESTRIAL NETWORK

CROSS-REFERENCE TO RELATED APPLICATIONS

This application is a continuation of U.S. patent application Ser. No. 17/653,715, filed Mar. 7, 2022, entitled "TIMING OFFSET SELECTION IN NON-TERRESTRIAL NETWORK," which is a continuation of U.S. patent application Ser. No. 17/449,507, filed Sep. 30, 2021, entitled "TIMING OFFSET SELECTION IN NON-TERRESTRIAL NETWORK," which claims priority to U.S. Provisional Patent Application No. 63/187,314, filed on May 11, 2021, entitled "TIMING OFFSET SELECTION IN NON-TERRESTRIAL NETWORK," the contents of which are incorporated herein by reference in their entireties.

FIELD OF THE DISCLOSURE

Aspects of the present disclosure generally relate to wireless communication and to techniques and apparatuses for selecting a timing offset in a non-terrestrial network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication performed by a user equipment (UE) includes receiving, from a non-terrestrial network (NTN) entity, a message that is associated with an uplink grant. The method may include selecting, based at least in part on the message, either a cell-specific offset or an updated offset that is indicated after initial access, as a timing offset that accounts for a propagation delay between a base station of the NTN and the UE, and transmitting, to the NTN entity, an uplink communication using the timing offset.

In some aspects, a method of wireless communication performed by a base station of an NTN includes transmitting, to a UE via an NTN entity, a message that is associated with an uplink grant. The method may include selecting, based at least in part on the message, either a cell-specific offset or an updated offset that is indicated after initial access, as a timing offset that accounts for a propagation delay between the base station and the UE, and receiving, from the UE via the NTN entity, an uplink communication using the timing offset.

In some aspects, a UE for wireless communication includes a memory and one or more processors coupled to the memory and configured to receive, from an NTN entity, a message that is associated with an uplink grant, select, based at least in part on the message, either a cell-specific offset or an updated offset that is indicated after initial access, as a timing offset that accounts for a propagation delay between a base station of the NTN and the UE, and transmit, to the NTN entity, an uplink communication using the timing offset.

In some aspects, a base station of an NTN for wireless communication includes a memory and one or more processors coupled to the memory and configured to transmit, to a UE via an NTN entity, a message that is associated with an uplink grant, select, based at least in part on the message, either a cell-specific offset or an updated offset that is indicated after initial access, as a timing offset that accounts for a propagation delay between the base station and the UE, and receive, from the UE via the NTN entity, an uplink communication using the timing offset.

In some aspects, a non-transitory computer-readable medium storing a set of instructions for wireless communication includes one or more instructions that, when executed by one or more processors of a UE, cause the UE to receive, from an NTN entity, a message that is associated with an uplink grant, select, based at least in part on the message, either a cell-specific offset or an updated offset that is indicated after initial access, as a timing offset that accounts for a propagation delay between a base station of the NTN and the UE, and transmit, to the NTN entity, an uplink communication using the timing offset.

In some aspects, a non-transitory computer-readable medium storing a set of instructions for wireless communication includes one or more instructions that, when executed by one or more processors of a base station, cause the base station to transmit, to a UE via an NTN entity, a message that is associated with an uplink grant, select, based at least in part on the message, either a cell-specific offset or an updated offset that is indicated after initial access, as a timing offset that accounts for a propagation delay between the base station and the UE, and receive, from the UE via the NTN entity, an uplink communication using the timing offset.

In some aspects, an apparatus for wireless communication includes means for receiving, from an NTN entity, a message that is associated with an uplink grant, means for selecting, based at least in part on the message, either a cell-specific offset or an updated offset that is indicated after initial access, as a timing offset that accounts for a propagation delay between a base station of the NTN and the apparatus, and means for transmitting, to the NTN entity, an uplink communication using the timing offset.

In some aspects, an apparatus for wireless communication includes means for transmitting, to a UE via an NTN entity, a message that is associated with an uplink grant, means for selecting, based at least in part on the message, either a cell-specific offset or an updated offset that is indicated after initial access, as a timing offset that accounts for a propagation delay between the apparatus and the UE, and means for receiving, from the UE via the NTN entity, an uplink communication using the timing offset.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
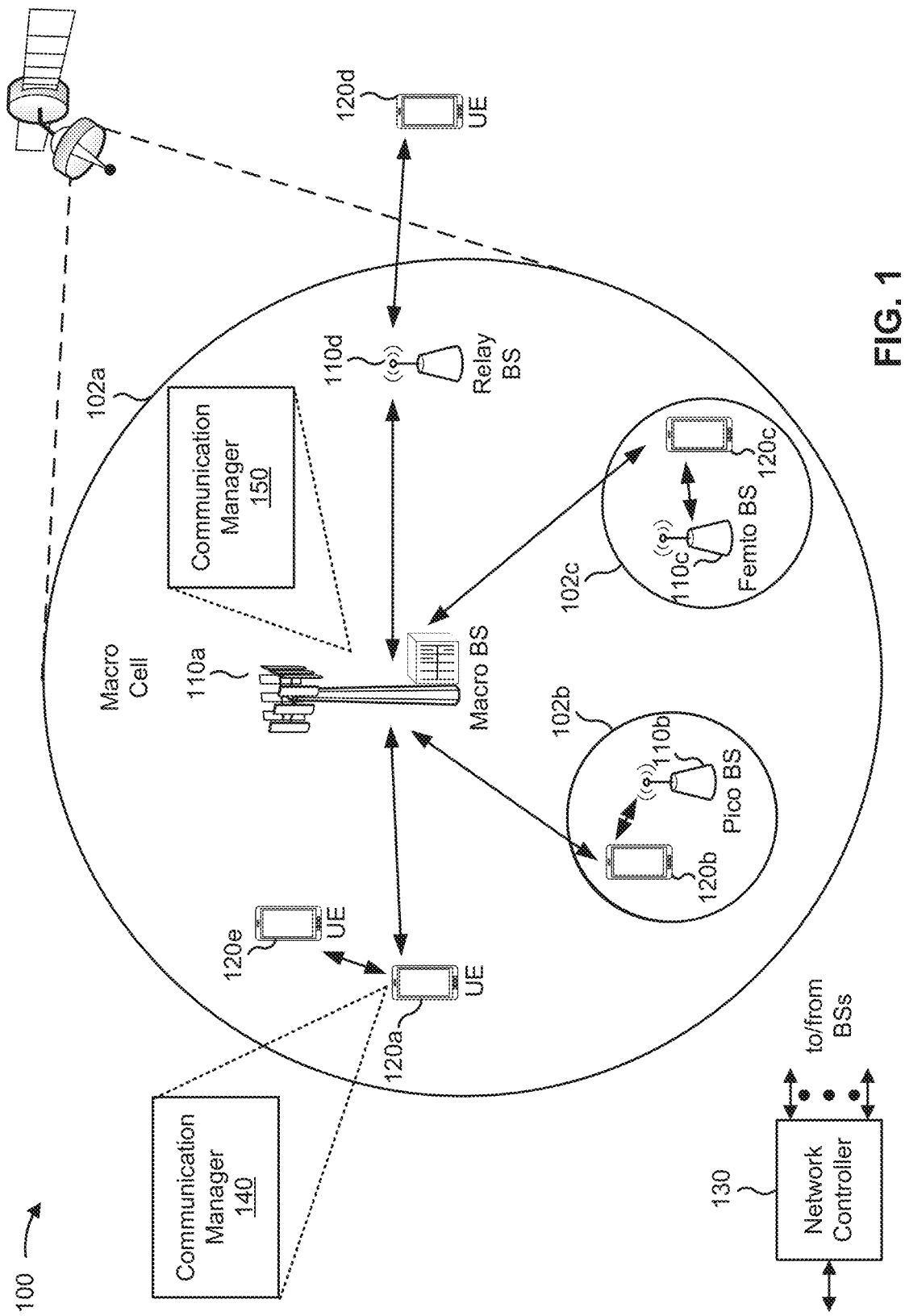
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

In some aspects, as shown in FIG. 1, a cell may be provided by a base station 110 of a non-terrestrial network. As used herein, "non-terrestrial network" (NTN) may refer to a network for which access is provided by a non-terrestrial base station, such as a base station carried by an NTN entity (e.g., satellite, a balloon, a dirigible, an airplane, an unmanned aerial vehicle, a high altitude platform station). A base station of the NTN may be a base station carried by the NTN entity (regenerative deployment) or a base station on the ground that communicates via the NTN entity (bent-pipe or transparent deployment).

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay. In some aspects, a relay station may be implemented using a non-terrestrial platform, similarly to the base station described above.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz—300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may receive, from an NTN entity, a message that is associated with an uplink grant. The communication manager 140 may select, based at least in part on the message, either a cell-specific offset or an updated offset that is indicated after initial access, as a timing offset that accounts for a propagation delay between a base station of the NTN and the UE, and transmit, to the NTN entity, an uplink communication using the timing offset. Additionally, or alternatively, the communication manager 140 may perform one or more other operations described herein.

In some aspects, a base station of the NTN may include a communication manager 150. As described in more detail elsewhere herein, the communication manager 150 may transmit, to a UE via an NTN entity, a message that is associated with an uplink grant. The communication manager 150 may select, based at least in part on the message, either a cell-specific offset or an updated offset that is indicated after initial access, as a timing offset that accounts for a propagation delay between the base station and the UE, and receive, from the UE via the NTN entity, an uplink communication using the timing offset. In some aspects, the base station may be at the NTN entity. Additionally, or alternatively, the communication manager 150 may perform one or more other operations described herein.

As indicated above, FIG. 1 is provided as an example. Other examples may differ from what is described with regard to FIG. 1.

Figure 2:
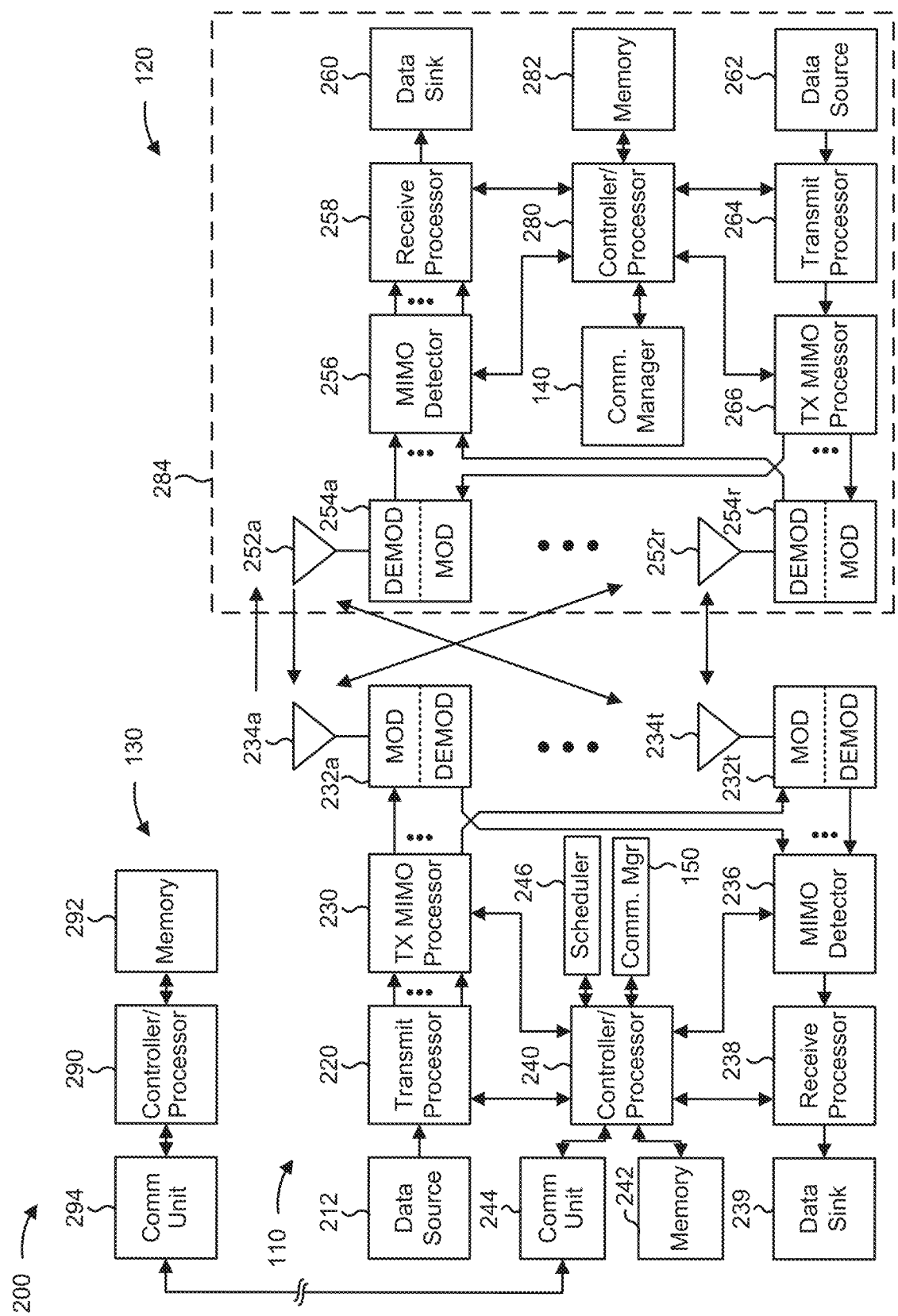
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-10).

Controller/processor 240 of base station 110, controller/processor 280 of UE 120, a controller/processor of an NTN entity, and/or any other component(s) of FIG. 2 may perform one or more techniques associated with selecting a timing offset in an NTN, as described in more detail elsewhere herein. For example, controller/processor 240 of base station 110 of an NTN, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 of the NTN and/or the UE 120, may cause the one or more processors, the UE 120, and/or the base station 110 of the NTN to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the UE 120 includes means for receiving, from an NTN entity, a message that is associated with an uplink grant, means for selecting, based at least in part on the message, either a cell-specific offset or an updated offset that is indicated after initial access, as a timing offset that accounts for a propagation delay between a base station of the NTN and the UE, and/or means for transmitting, to the NTN entity, an uplink communication using the timing offset. The means for the UE 120 to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the base station 110 of the NTN includes means for transmitting, to a UE, a message that is associated with an uplink grant, means for selecting, based at least in part on the message, either a cell-specific offset or an updated offset that is indicated after initial access, as a timing offset that accounts for a propagation delay between the base station 110 and the UE, and/or means for receiving, from the UE via the NTN entity, an uplink communication using the timing offset. In some aspects, the means for the NTN to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
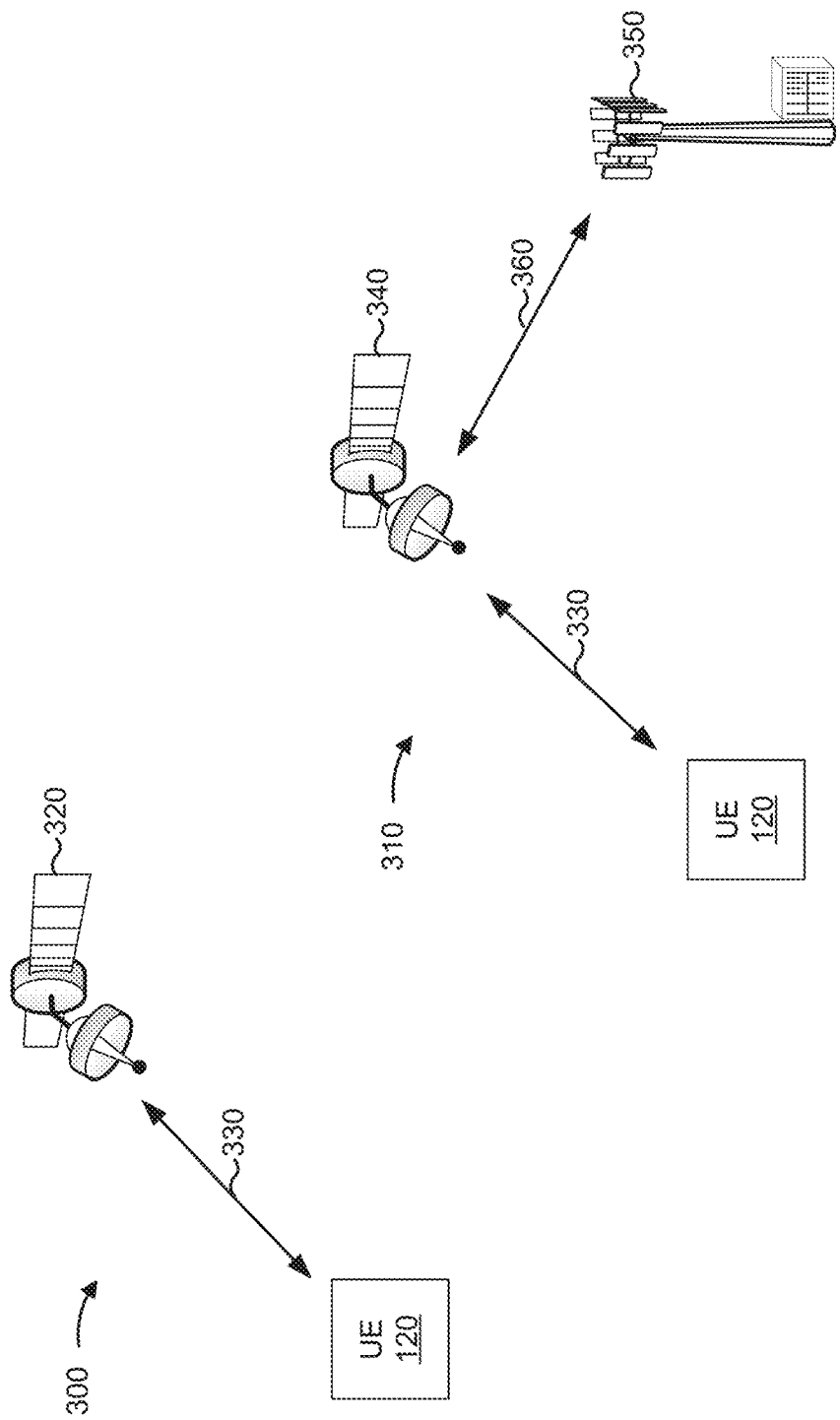
FIG. 3 is a diagram illustrating an example of a regenerative satellite deployment and an example of a transparent satellite deployment in a non-terrestrial network (NTN).

FIG. 3 is a diagram illustrating an example 300 of a regenerative satellite deployment and an example 310 of a transparent satellite deployment in an NTN.

Example 300 shows a regenerative satellite deployment. In example 300, a UE 120 is served by a satellite 320 via a service link 330. For example, the satellite 320 may include a BS 110 (e.g., BS 110a), or a gNB. In some aspects, the satellite 320 may be referred to as a non-terrestrial base station, a regenerative repeater, an on-board processing repeater, or an NTN entity. In some aspects, the satellite 320 may demodulate an uplink radio frequency signal and may modulate a baseband signal derived from the uplink radio signal to produce a downlink radio frequency transmission. The satellite 320 may transmit the downlink radio frequency signal on the service link 330. The satellite 320 may provide a cell that covers the UE 120.

Example 310 shows a transparent satellite deployment, which may also be referred to as a bent-pipe satellite deployment. In example 310, a UE 120 is served by a satellite 340 via the service link 330. The satellite 340 may also be considered to be an NTN entity. The satellite 340 may be a transparent satellite. The satellite 340 may relay a signal received from gateway 350 (e.g., base station 110) via a feeder link 360. For example, the satellite 340 may receive an uplink radio frequency transmission and may transmit a downlink radio frequency transmission without demodulating the uplink radio frequency transmission. In some aspects, the satellite 340 may frequency convert the uplink radio frequency transmission received on the service link 330 to a frequency of the uplink radio frequency transmission on the feeder link 360 and may amplify and/or filter the uplink radio frequency transmission. In some aspects, the UEs 120 shown in example 300 and example 310 may be associated with a Global Navigation Satellite System (GNSS) capability, or a Global Positioning System (GPS) capability, though not all UEs have such capabilities. The satellite 340 may provide a cell that covers the UE 120.

The service link 330 may include a link between the satellite 340 and the UE 120, and may include one or more of an uplink or a downlink. The feeder link 360 may include a link between the satellite 340 and the gateway 350, and may include one or more of an uplink (e.g., from the UE 120 to the gateway 350) or a downlink (e.g., from the gateway 350 to the UE 120).

The feeder link 360 and the service link 330 may each experience Doppler effects due to the movement of the satellites 320 and 340, and potentially movement of a UE 120. These Doppler effects may be significantly larger than in a terrestrial network. The Doppler effect on the feeder link 360 may be compensated for to some degree, but may still be associated with some amount of uncompensated frequency error. Furthermore, the gateway 350 may be associated with a residual frequency error, and/or the satellite 320/340 may be associated with an on-board frequency error. These sources of frequency error may cause a received downlink frequency at the UE 120 to drift from a target downlink frequency.

As indicated above, FIG. 3 is provided as an example. Other examples may differ from what is described with regard to FIG. 3.

Figure 4:
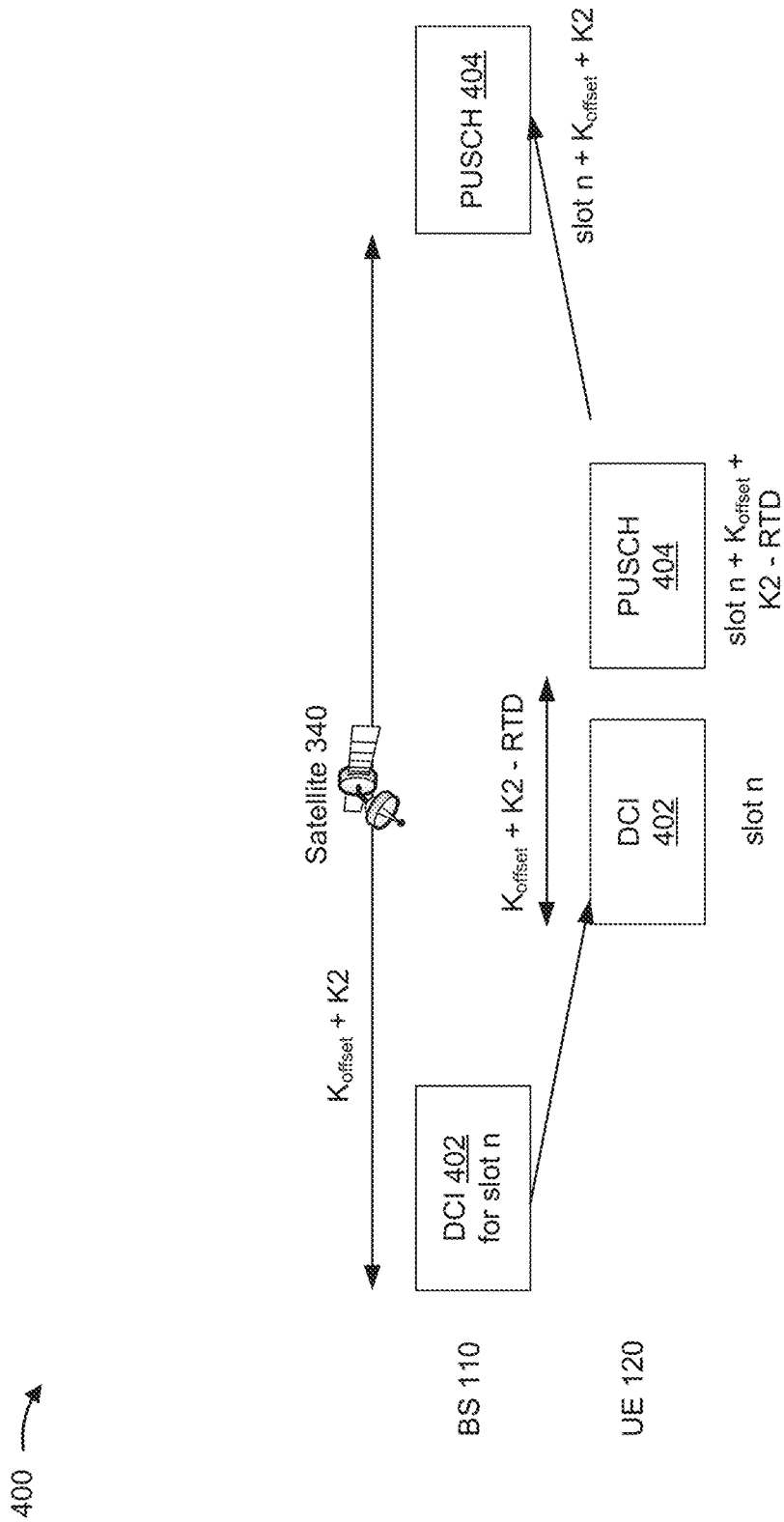
FIG. 4 is a diagram illustrating an example of a timing offset, in accordance with the present disclosure.

FIG. 4 is a diagram illustrating an example 400 of a timing offset, in accordance with the present disclosure.

Example 400 shows an example of a timing offset $K_{offset}$ that may be used to account for a large propagation delay in the NTN, to ensure causality between a downlink control information (DCI) 402 on a physical downlink control channel (PDCCH) and a communication 404 on a physical uplink shared channel (PUSCH) that is scheduled by the DCI (the communication 404 comes after the DCI 402). Causality may be violated because the uplink subframe n and the downlink subframe n at the UE 120 are not aligned in time, and the misalignment may be large in an NTN. A duration of $K_{offset}$ may be greater in length than a round trip delay (RTD) between the base station 110 (e.g., gNB) of the NTN and the UE 120, via the NTN entity (e.g., satellite 340) in the NTN, where the RTD is in slots. K2 may represent a duration between the DCI 402 and the PUSCH communication 404 in a terrestrial network. However, with a longer propagation delay (e.g., 100 ms) in an NTN, $K_{offset}$ may be added as a timing offset, such that a duration between the transmission of the DCI 402 by the base station 110 and the reception of the associated PUSCH communication 404 scheduled by the DCI 402 is $K_{offset}$+K2. By using $K_{offset}$, the UE 120 may transmit, and the base station 110 may expect, the PUSCH communication 404 at an appropriate time. In a scenario of a regenerative satellite deployment, $K_{offset}$ may be used for communications between the UE 120 and a base station 110 carried by the satellite 320 (not shown in FIG. 4).

As indicated above, FIG. 4 is provided as an example. Other examples may differ from what is described with regard to FIG. 4.

Figure 5:
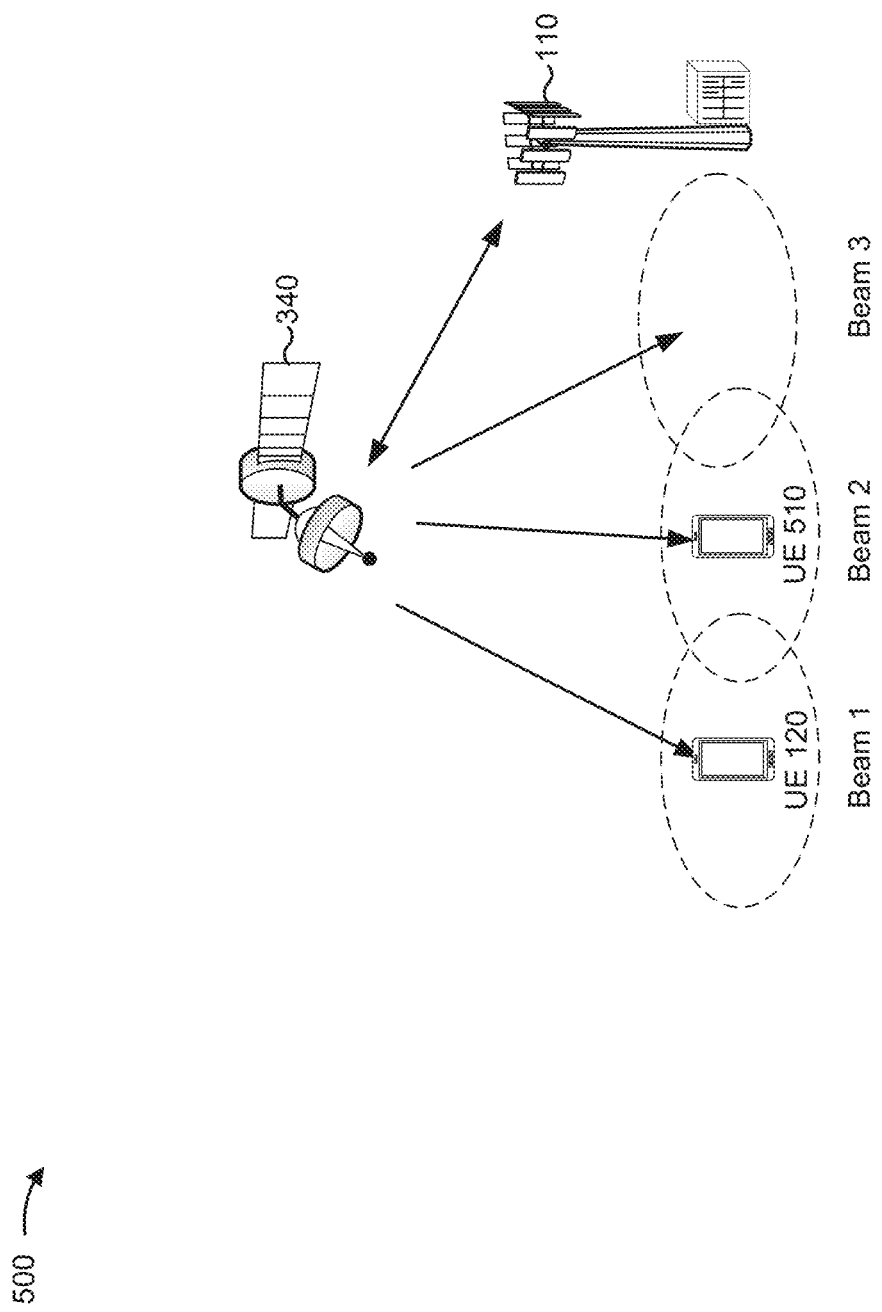
FIG. 5 is a diagram illustrating an example of timing offsets, in accordance with the present disclosure.

FIG. 5 is a diagram illustrating an example 500 of timing offsets, in accordance with the present disclosure. Example 500 shows that the base station 110 may communicate with the UE 120 and another UE 510 via the satellite 340.

UE 120 may perform a procedure for establishing a connection with the base station 110. The procedure may be referred to as "initial access." UE 120 may use a cell-specific offset as a timing offset $K_{offset}$ for the initial access. The cell-specific offset may be specific to a cell because the UE 120 may receive the cell-specific timing offset in a system information block one (SIB1) that is broadcast within a cell.

UE 120 may later, after the initial access, receive an indication of an updated offset to use as the timing offset $K_{offset}$ (updated $K_{offset}$). A value of the updated offset may be indicated in a medium access control element (MAC-CE) or a radio resource control (RRC) message. The updated offset may be considered an update over the cell-specific offset that the UE 120 originally used for the initial access. The updated timing offset may be non-cell-specific. That is, the updated offset may be UE-specific, beam-specific, or UE group-specific. A duration of the updated offset may be shorter than a duration of the cell-specific offset and thus the updated offset may reduce a delay between the DCI and the PUSCH communication, which improves throughput.

Example 500 shows that the satellite 340 may use multiple beams to communicate with multiple UEs. If there are multiple beams, the cell-specific offset may be whichever $K_{offset}$ has a greater duration between the UEs, such as between UE 120 and UE 510. For some UEs, the cell-specific offset may cause too much delay, and a UE may prefer a more customized $K_{offset}$ (UE-specific or beam specific). While a UE may receive an updated offset, in some scenarios, the cell-specific offset may still be a more appropriate $K_{offset}$. However, the UE is not able to select between the cell-specific offset and the updated offset. As a result, throughput for the UEs may not be optimal.

As indicated above, FIG. 5 is provided as an example. Other examples may differ from what is described with regard to FIG. 5.

Figure 6:
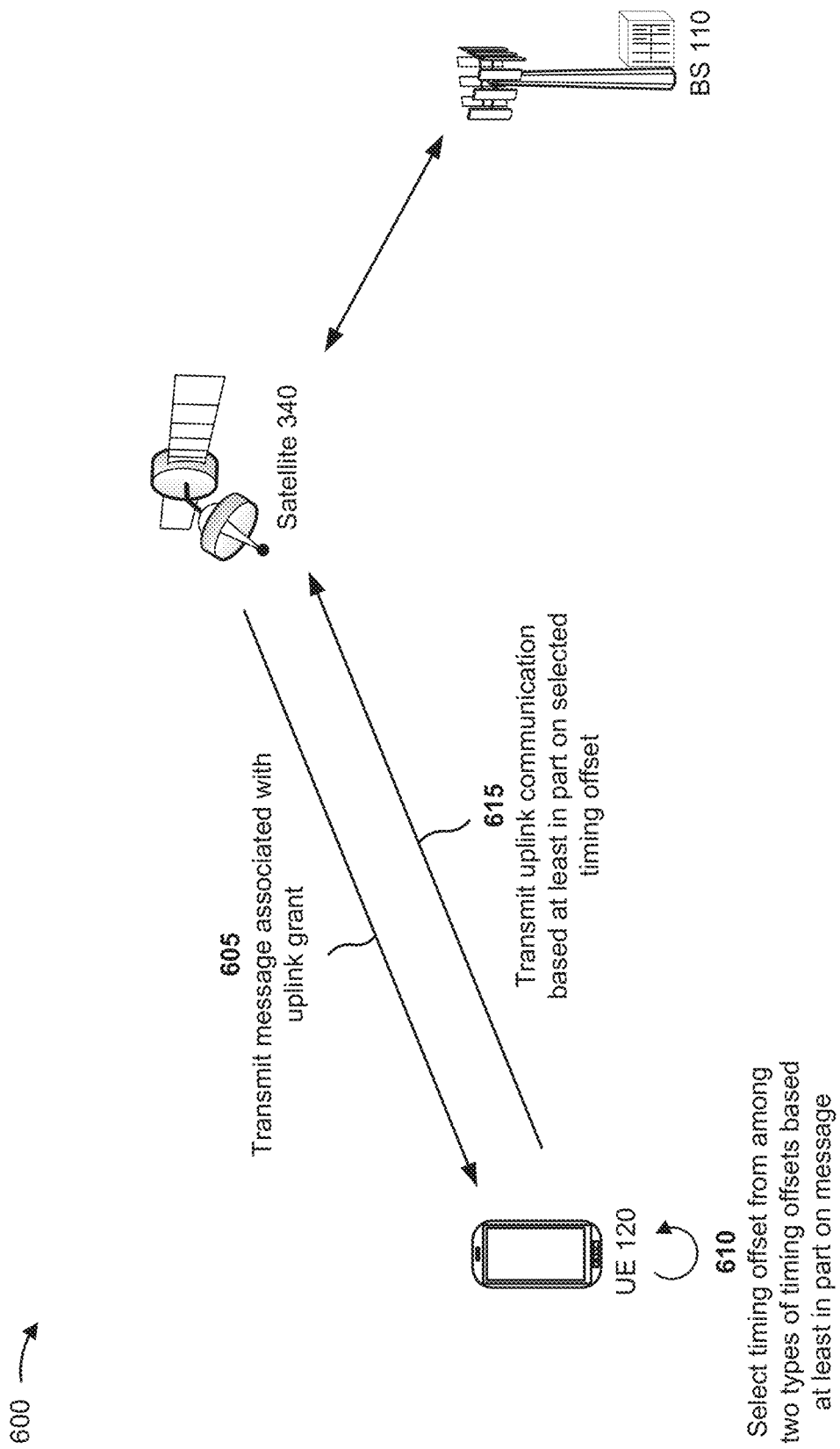
FIG. 6 is a diagram illustrating an example of selecting a timing offset in an NTN, in accordance with the present disclosure.

FIG. 6 is a diagram illustrating an example 600 of selecting a timing offset in an NTN, in accordance with the present disclosure. As shown, FIG. 6 includes a base station 110 and a UE 120 that may communicate with each other over a satellite link via the satellite 340 (e.g., relay station). While the base station 110 is shown as a ground station in FIG. 6, in some scenarios, the base station 110 may be carried by the satellite 340.

According to various aspects described herein, the UE 120 may select, from among two types of timing offsets, a timing offset ($K_{offset}$) that will account for a propagation delay in an NTN. For example, the UE 120 may select between a cell-specific offset (Type 1) and an updated offset (Type 2) that may be non-cell-specific (e.g., UE-specific, UE group-specific, beam-specific). The updated offset may be received in a MAC-CE or an RRC message after the initial cell-specific offset is received in an SIB1. The UE 120 may select the timing offset, from among the two types of timing offsets, based at least in part on a message (e.g., DCI) that is associated with an uplink grant. The UE 120 may also select the timing offset based at least in part on a rule, such as whether the UE 120 is currently performing an initial access or a random access procedure. With the ability to select between two types of timing offsets, the UE 120 may select a more optimal timing offset to reduce latency and to conserve processing resources and signaling resources with improved communications.

Example 600 shows the UE 120 in communication with an NTN entity (e.g., the satellite 340). The satellite 340 may be or may carry a base station or the UE 120 may be in communication with BS 110 via the satellite 340. As shown by reference number 605, the satellite 340 may transmit a message to the UE 120 that is associated with an uplink grant. The message may be associated with an uplink grant if the message explicitly indicates resources for the uplink grant or if the corresponding uplink transmission is a hybrid automatic repeat request (HARQ) acknowledgement (ACK) or negative acknowledgment (NACK) in response to a physical downlink shared channel (PDSCH) communication that is scheduled by semi-persistent scheduling (SPS) or by a configured grant (CG).

As shown by reference number 610, the UE 120 may select a timing offset ($K_{offset}$) from among the at least two types of timing offsets based at least in part on the message. As shown by reference number 615, the UE 120 may transmit an uplink transmission based at least in part on the selected timing offset.

The message may be a DCI. In some aspects, if the DCI does not include an indication of a resource allocation (resource allocation is indicated in a message other than the DCI), the UE 120 may select the updated timing offset (Type 2) for the uplink transmission.

The message may include DCI that indicates a resource allocation, or an explicit uplink grant. The CRC of the DCI may be scrambled by a radio network temporary identifier (RNTI). If the RNTI is not addressed to a specific UE, such as a random access RNTI (RA-RNTI), a temporary cell RNTI (TC-RNTI), or MsgB-RNTI, the UE 120 may select the cell-specific offset (Type 1) for the uplink transmission. The uplink transmission may be a Msg3 initial transmission in a 4-step random access channel (RACH) procedure (e.g., the CRC of the scheduling DCI is scrambled by RA-RNTI), Msg3 retransmission in the 4-step RACH procedure (e.g., the CRC of the scheduling DCI is scrambled by TC-RNTI), a HARQ ACK/NACK in response to a contention resolution message (Msg4) in a 4-step RACH procedure (e.g., the CRC of the scheduling DCI is scrambled by TC-RNTI), or a HARQ ACK/NACK in response to MsgB in a 2-step RACH procedure (e.g., the CRC of the scheduling DCI is scrambled by MsgB-RNTI).

If the RNTI is addressed to a specific UE (e.g., C-RNTI), the UE 120 may select the updated offset. The updated offset may be UE-specific (Type 2.2) for the uplink transmission if a UE-specific type of timing offset is configured. Otherwise, the updated offset may be beam-specific or UE group-specific (Type 2.1) for the uplink transmission. The uplink transmission may be a PUSCH communication or a HARQ ACK/NACK in response to a PDSCH communication. In some aspects, there may be an exception for the scenario of C-RNTI. If the DCI includes a physical downlink control channel (PDCCH) order, which is addressed with C-RNTI, the UE 120 may select the cell-specific timing offset as the $K_{offset}$. This is because the timing may be misaligned, which may be a reason for the network to initiate the PDCCH order. The UE 120 may use cell-specific $K_{offset}$ (Type 1) for all uplink transmissions (e.g., PUSCH, physical uplink control channel (PUCCH), HARQ ACK in response to downlink transmissions) until the UE receives a new updated $K_{offset}$ (Type 2).

In some aspects, if the UE 120 is provided a cell-specific $K_{offset}$ (Type 1) and an updated $K_{offset}$ (Type 2), the UE 120 may apply the cell-specific $K_{offset}$ (Type 1) to Msg3 transmissions and retransmissions with scrambling initialized by a TC-RNTI and to HARQ ACK transmissions in response to a downlink transmission scheduled by a DCI, the cyclic redundancy check (CRC) of which is scrambled by a TC-RNTI or a MsgB-RNTI. These uplink transmissions may invalidate an updated $K_{offset}$ (Type 2). For example, a HARQ ACK in response to a Msg4 (contention resolution message in the 4-step contention based RACH procedure) that is scheduled by a DCI with the CRC scrambled by a TC-RNTI may invalidate the updated $K_{offset}$ (Type 2), if the UE 120 has received the updated $K_{offset}$ (Type 2) at an earlier time (e.g., before the 4-step contention based RACH procedure starts), and thus the UE may not use the updated $K_{offset}$ (Type 2) until it receives a new updated $K_{offset}$ (Type 2). For transmitting the HARQ ACK in response to the Msg4, the UE 120 may use the cell-specific offset.

The UE 120 may apply the updated $K_{offset}$ (Type 2) to all other timing relationships associated with $K_{offset}$. Some of the other timing relationships may include a PUSCH communication scheduled by a CG, a HARQ ACK/NACK in response to a PDSCH communication scheduled by SPS, a PUSCH communication scheduled by a DCI whose CRC is scrambled by a C-RNTI, a HARQ ACK/NACK in response to a PDSCH communication scheduled by a DCI whose CRC is scrambled by a C-RNTI, and a PUCCH communication.

In some aspects, the UE 120 may select the timing offset further based at least in part on one or more rules. For example, the UE 120 may select a cell-specific offset for uplink transmissions during an initial access and during random access (e.g., contention-based random access, contention-free random access). Note that a random access channel (RACH) procedure may occur during the initial access or after the initial access (e.g., in handover, for PDCCH order). The UE 120 may use an updated $K_{offset}$ (Type 2) after the UE 120 receives the updated $K_{offset}$.

An updated offset may override any previously received cell-specific offset, and the UE 120 may use the updated offset (e.g., non-cell-specific) for other uplink transmissions, such as for HARQ ACK/NACK in response to a PDSCH communication (DCI scheduled or SPS scheduled) or a PUSCH communication (e.g., DCI scheduled or CG scheduled).

Note that the end of the initial access may be defined by stored configuration information or an SIB. For example, the initial access may end if the UE 120 transmits a HARQ ACK in response to a Msg4 in a 4-step RACH procedure, a HARQ ACK in response to a MsgB in a 2-step RACH procedure, or a Msg5 in a 4-step RACH. The initial access may end a time after UE 120 receives a UE-specific configuration. Random access in connected mode may end as defined by stored configuration information or an SIB. For example, the random access may end with a PUSCH communication in response to a random access response (for contention-based random access or contention-free random access).

In some aspects, the message may include an indication of which timing offset to select. For example, a DCI used for scheduling may include an indication of the cell-specific offset or the updated offset. The indication may be in the DCI that provides the uplink grant or in a MAC-CE or RRC message that preceded the DCI. If the DCI is not used for scheduling (e.g., SPS or CG), the DCI, a MAC-CE, or an RRC message may include the indication. In some aspects, an uplink grant may include an uplink resource allocation.

By selecting the timing offset from among multiple types of timing offsets, the UE 120 may optimize communications in the NTN and conserve signaling resources.

Figure 7:
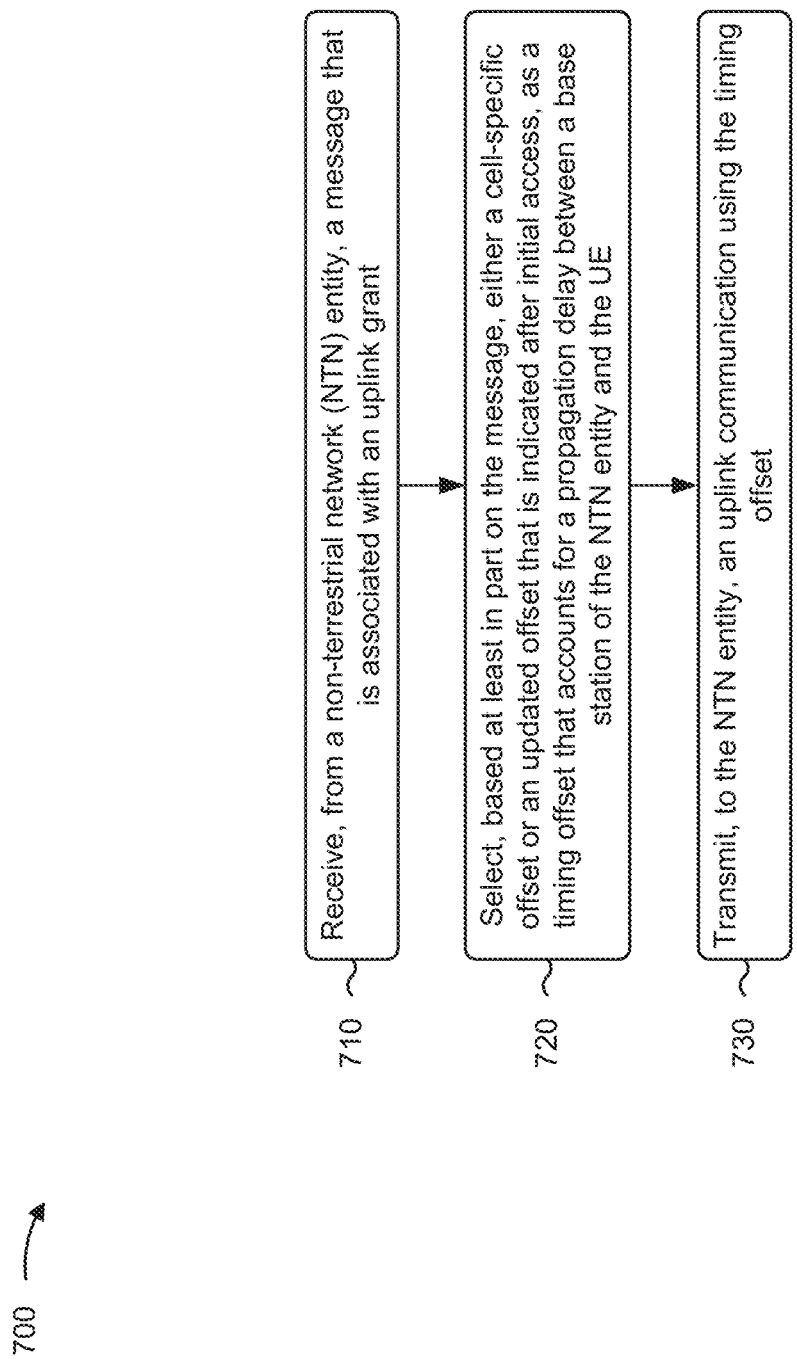
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with selecting a timing offset in an NTN.

As shown in FIG. 7, in some aspects, process 700 may include receiving, from an NTN entity, a message that is associated with an uplink grant (block 710). For example, the UE (e.g., using communication manager 140 and/or reception component 902 depicted in FIG. 9) may receive, from an NTN entity, a message that is associated with an uplink grant, as described above.

As further shown in FIG. 7, in some aspects, process 700 may include selecting, based at least in part on the message, either a cell-specific offset or an updated offset that is indicated after initial access, as a timing offset that accounts for a propagation delay between a base station of the NTN and the UE (block 720). For example, the UE (e.g., using communication manager 140 and/or selection component 908 depicted in FIG. 9) may select, based at least in part on the message, either a cell-specific offset or an updated offset that is indicated after initial access, as a timing offset that accounts for a propagation delay between a base station of the NTN and the UE, as described above.

As further shown in FIG. 7, in some aspects, process 700 may include transmitting, to the NTN entity, an uplink communication using the timing offset (block 730). For example, the UE (e.g., using communication manager 140 and/or transmission component 904 depicted in FIG. 9) may transmit, to the NTN entity, an uplink communication using the timing offset, as described above.

Process 700 may include additional aspects, such as any single aspect or any combination of aspects described below and/or in connection with one or more other processes described elsewhere herein.

In a first aspect, the updated offset is a UE-specific offset.

In a second aspect, alone or in combination with the first aspect, the updated offset is a UE group-specific offset.

In a third aspect, alone or in combination with one or more of the first and second aspects, the updated offset is a beam-specific offset.

In a fourth aspect, alone or in combination with one or more of the first through third aspects, the updated offset is an update over the cell-specific offset.

In a fifth aspect, alone or in combination with one or more of the first through fourth aspects, a duration of the updated offset is shorter than a duration of the cell-specific offset.

In a sixth aspect, alone or in combination with one or more of the first through fifth aspects, the updated offset is selected as the timing offset if a resource allocation is indicated in a message other than DCI.

In a seventh aspect, alone or in combination with one or more of the first through sixth aspects, the message includes DCI associated with a CRC that is scrambled with an RNTI, and the timing offset is selected based at least in part on a type of the RNTI.

In an eighth aspect, alone or in combination with one or more of the first through seventh aspects, the cell-specific offset is selected as the timing offset if the CRC of the DCI is scrambled with an RNTI that is not UE-specific.

In a ninth aspect, alone or in combination with one or more of the first through eighth aspects, the updated offset is selected if the CRC of the DCI is scrambled with an RNTI that is UE-specific.

In a tenth aspect, alone or in combination with one or more of the first through ninth aspects, the cell-specific offset is selected if the CRC of the DCI is scrambled with an RNTI that is UE-specific and the DCI indicates a PDCCH order.

In an eleventh aspect, alone or in combination with one or more of the first through tenth aspects, selecting the timing offset includes selecting the cell-specific offset if the UE is performing one or more of initial access or random access.

In a twelfth aspect, alone or in combination with one or more of the first through eleventh aspects, selecting the timing offset includes selecting the updated offset if the UE is to transmit, in association with the message, HARQ feedback or a PUSCH communication.

In a thirteenth aspect, alone or in combination with one or more of the first through twelfth aspects, the message includes DCI and selecting the timing offset includes selecting either the cell-specific offset or the updated offset based at least in part on an indication in the DCI of whether to select the cell-specific offset or the updated offset.

In a fourteenth aspect, alone or in combination with one or more of the first through thirteenth aspects, process 700 includes receiving a MAC-CE or RRC message that includes an indication of whether to select the cell-specific offset or the updated offset, and selecting the timing offset includes selecting either the cell-specific offset or the updated offset based at least in part on the indication in the MAC-CE or RRC message.

In a fifteenth aspect, alone or in combination with one or more of the first through fourteenth aspects, selecting the timing offset includes selecting the cell-specific offset if the uplink communication is an initial Msg3 transmission.

In a sixteenth aspect, alone or in combination with one or more of the first through fifteenth aspects, selecting the timing offset includes selecting the cell-specific offset if the uplink communication is a Msg3 retransmission scheduled by DCI with a CRC that is scrambled by a TC-RNTI.

In a seventeenth aspect, alone or in combination with one or more of the first through sixteenth aspects, selecting the timing offset includes selecting the cell-specific offset if the uplink communication is a hybrid automatic repeat request acknowledgement in response to a Msg4 transmission scheduled by DCI with a CRC that is scrambled by a TC-RNTI.

In an eighth aspect, alone or in combination with one or more of the first through seventeenth aspects, selecting the timing offset includes selecting the cell-specific offset if the uplink communication is a HARQ ACK in response to a MsgB transmission scheduled by DCI with a CRC that is scrambled by a MsgB RNTI Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
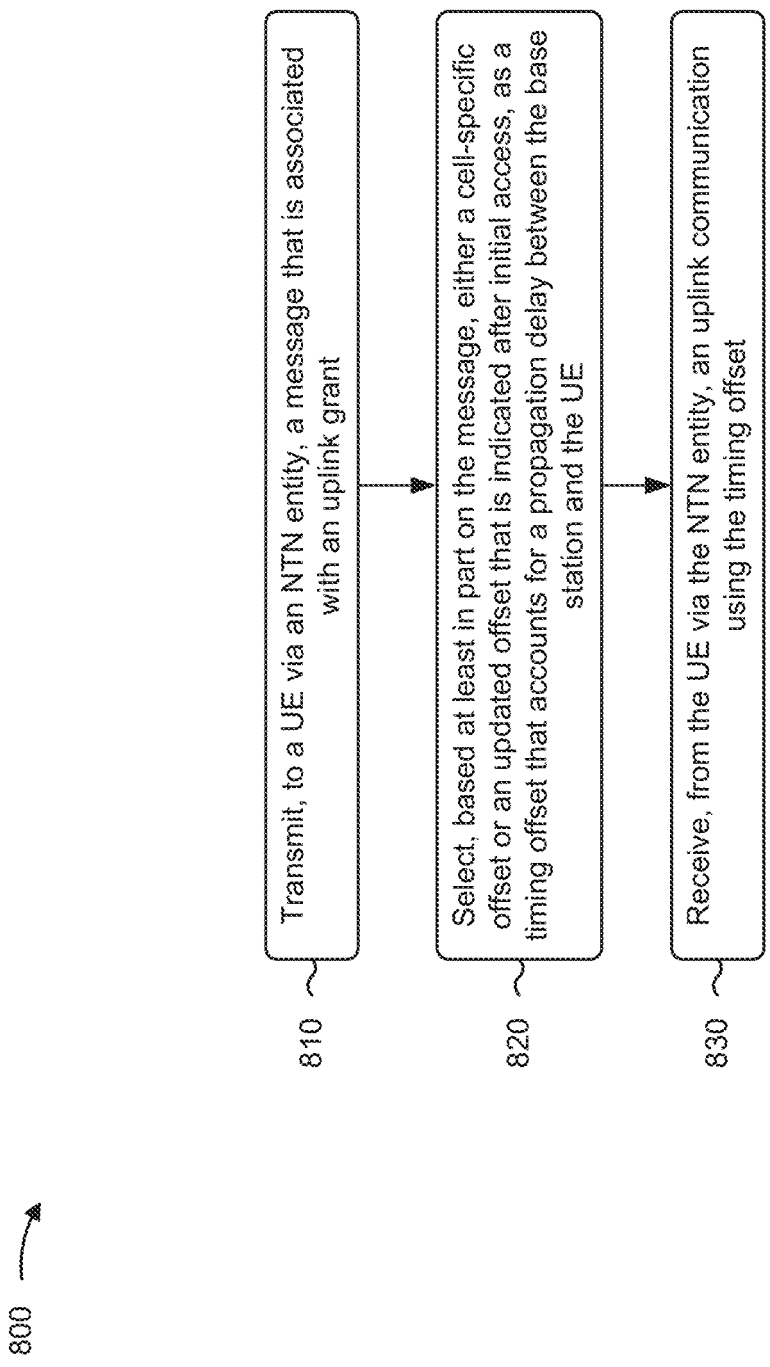
FIG. 8 is a diagram illustrating an example process performed, for example, by a base station of an NTN, in accordance with the present disclosure.

FIG. 8 is a diagram illustrating an example process 800 performed, for example, by a base station (e.g., BS 110, satellite 320, satellite 340, gateway 350) of an NTN, in accordance with the present disclosure. Example process 800 is an example where the base station performs operations associated with selecting a timing offset in an NTN.

As shown in FIG. 8, in some aspects, process 800 may include transmitting, to a UE via an NTN entity, a message that is associated with an uplink grant (block 810). For example, the base station (e.g., using communication manager 150 and/or transmission component 1004 depicted in FIG. 10) may transmit, to a UE, a message that is associated with an uplink grant, as described above.

As further shown in FIG. 8, in some aspects, process 800 may include selecting, based at least in part on the message, either a cell-specific offset or an updated offset that is indicated after initial access, as a timing offset that accounts for a propagation delay between the base station and the UE (block 820). For example, the base station (e.g., using communication manager 150 and/or selection component 1008 depicted in FIG. 10) may select, based at least in part on the message, either a cell-specific offset or an updated offset that is indicated after initial access, as a timing offset that accounts for a propagation delay between the base station and the UE, as described above.

As further shown in FIG. 8, in some aspects, process 800 may include receiving, from the UE via the NTN entity, an uplink communication using the timing offset (block 830). For example, the base station (e.g., using communication manager 150 and/or reception component 1002 depicted in FIG. 10) may receive, from the UE via the NTN entity, an uplink communication using the timing offset, as described above.

Process 800 may include additional aspects, such as any single aspect or any combination of aspects described below and/or in connection with one or more other processes described elsewhere herein.

In a first aspect, the updated offset is a UE-specific offset.

In a second aspect, alone or in combination with the first aspect, the updated offset is a UE group-specific offset.

In a third aspect, alone or in combination with one or more of the first and second aspects, the updated offset is a beam-specific offset.

In a fourth aspect, alone or in combination with one or more of the first through third aspects, the updated offset is selected as the timing offset if a resource allocation is indicated in a message other than DCI.

In a fifth aspect, alone or in combination with one or more of the first through fourth aspects, the message includes DCI associated with a CRC that is scrambled with an RNTI, and the timing offset is selected based at least in part on a type of the RNTI.

In a sixth aspect, alone or in combination with one or more of the first through fifth aspects, the cell-specific offset is selected as the timing offset if the CRC of the DCI is scrambled with an RNTI that is not UE-specific.

In a seventh aspect, alone or in combination with one or more of the first through sixth aspects, the updated offset is selected if the CRC of the DCI is scrambled with an RNTI that is UE-specific.

In an eighth aspect, alone or in combination with one or more of the first through seventh aspects, the cell-specific offset is selected if the CRC of the DCI is scrambled with an RNTI that is UE-specific and the DCI indicates a PDCCH order.

In a ninth aspect, alone or in combination with one or more of the first through eighth aspects, selecting the timing offset includes selecting the cell-specific offset if the UE is performing one or more of initial access or random access.

In a tenth aspect, alone or in combination with one or more of the first through ninth aspects, selecting the timing offset includes selecting the updated offset if the UE is to transmit, in association with the message, HARQ feedback or a PUSCH communication.

In an eleventh aspect, alone or in combination with one or more of the first through tenth aspects, the message includes DCI and selecting the timing offset includes selecting either the cell-specific offset or the updated offset based at least in part on an indication in the DCI of whether to select the cell-specific offset or the updated offset.

In a twelfth aspect, alone or in combination with one or more of the first through eleventh aspects, process 800 includes transmitting a MAC-CE or RRC message that includes an indication of whether to select the cell-specific offset or the updated offset, and selecting the timing offset includes selecting either the cell-specific offset or the updated offset based at least in part on the indication in the MAC-CE or RRC message.

In a thirteenth aspect, alone or in combination with one or more of the first through twelfth aspects, selecting the timing offset includes selecting the cell-specific offset if the uplink communication is a Msg3 transmission or a Msg3 retransmission with scrambling initialized by an RNTI that is not UE specific.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
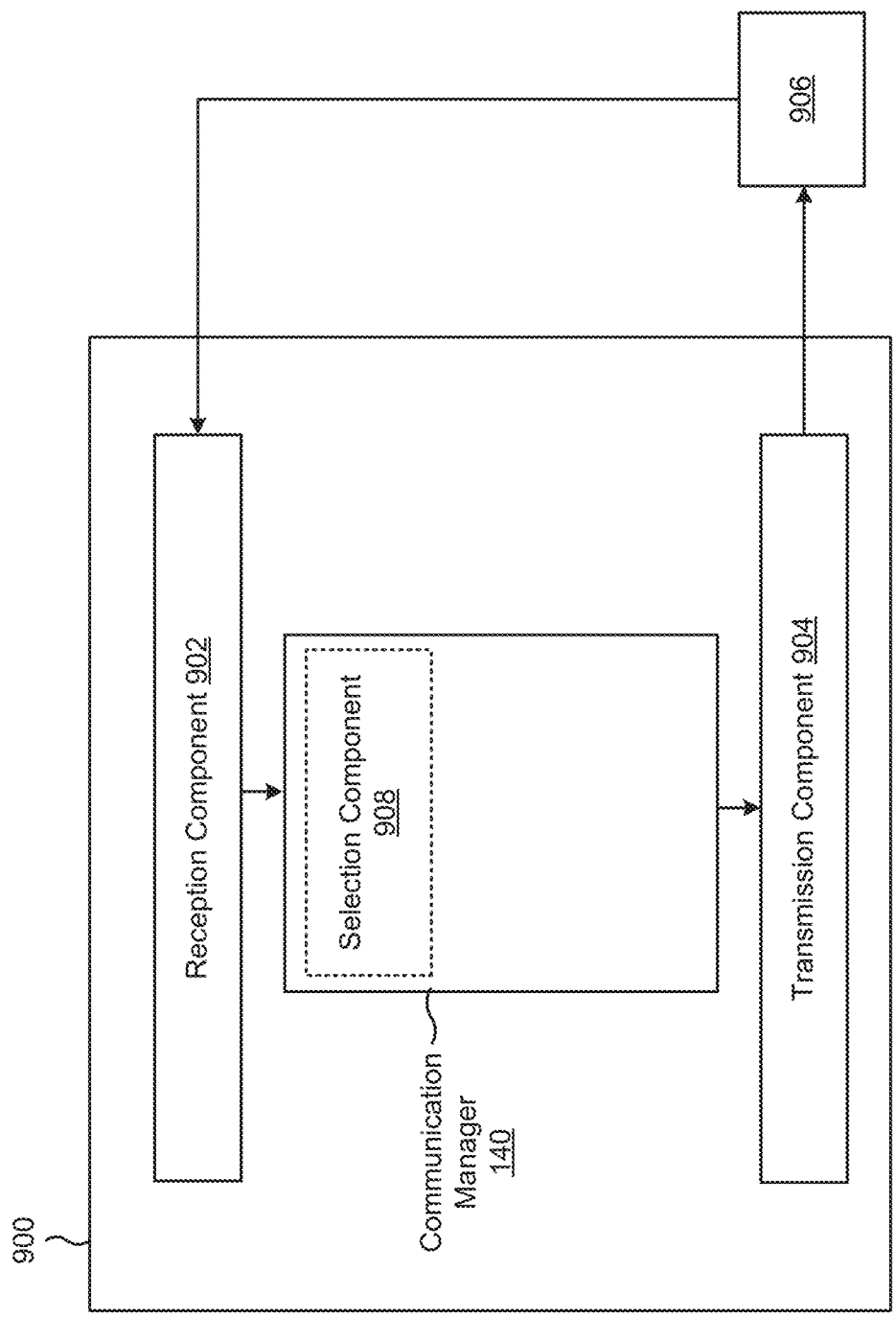
FIGS. 9-10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, an NTN entity, a base station of an NTN, or another wireless communication device) using the reception component 902 and the transmission component 904. As further shown, the apparatus 900 may include the communication manager 140. The communication manager 140 may include a selection component 908, among other examples.

In some aspects, the apparatus 900 may be configured to perform one or more operations described herein in connection with FIGS. 1-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The reception component 902 may receive, from an NTN entity, a message that is associated with an uplink grant. The selection component 908 may select, based at least in part on the message, either a cell-specific offset or an updated offset that is indicated after initial access, as a timing offset that accounts for a propagation delay between a base station of the NTN and the UE. The transmission component 904 may transmit, to the NTN entity, an uplink communication using the timing offset.

The reception component 902 may receive a MAC-CE or RRC message that includes an indication of whether to select the cell-specific offset or the updated offset, and the selection component 908 may select, as the timing offset, either the cell-specific offset or the updated offset based at least in part on the indication in the MAC-CE or RRC message.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
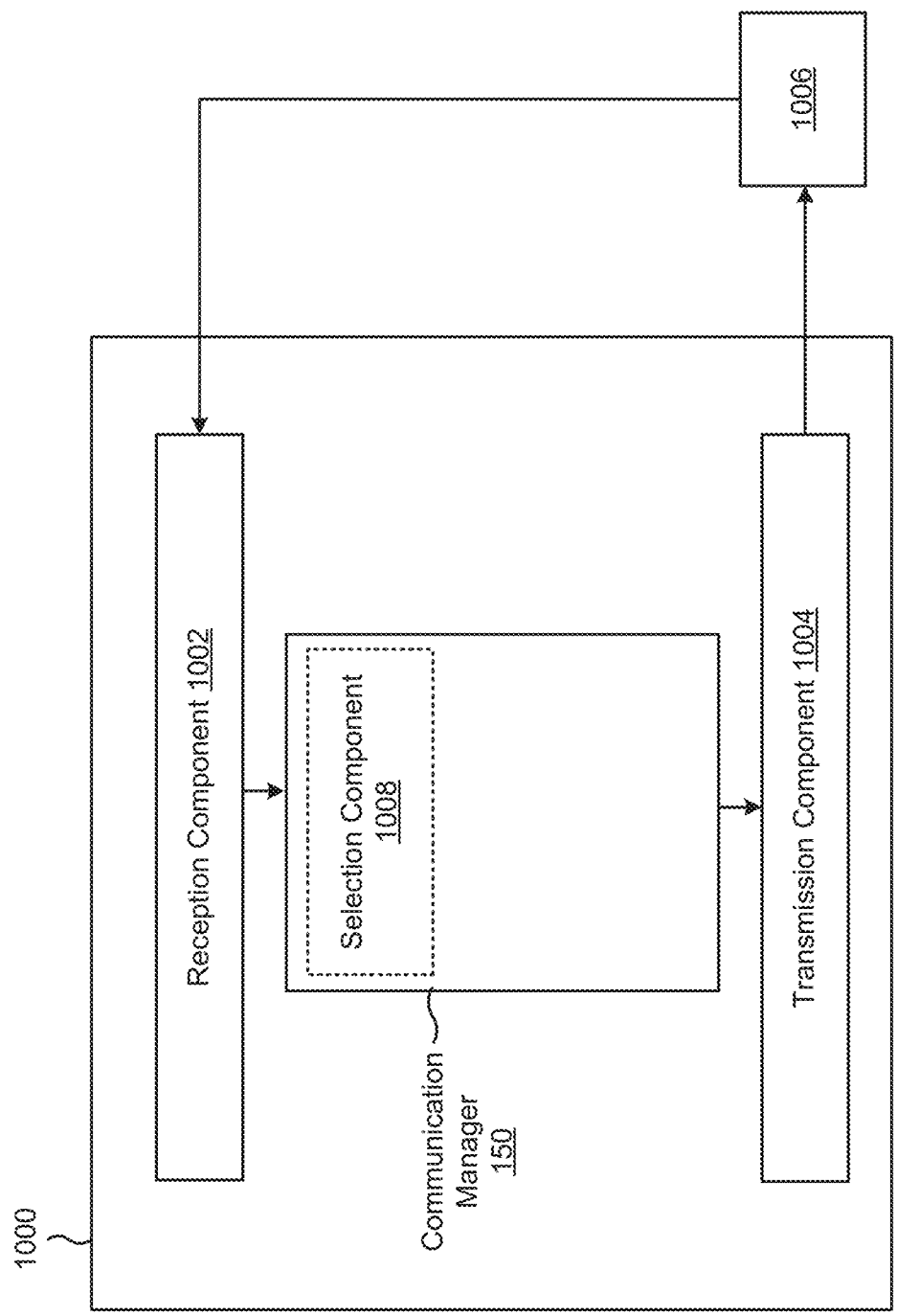

FIG. 10 is a block diagram of an example apparatus 1000 for wireless communication. The apparatus 1000 may be a base station of an NTN, or the base station of the NTN may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, an NTN entity, or another wireless communication device) using the reception component 1002 and the transmission component 1004. As further shown, the apparatus 1000 may include the communication manager 150. The communication manager 150 may include a selection component 1008, among other examples.

In some aspects, the apparatus 1000 may be configured to perform one or more operations described herein in connection with FIGS. 1-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the NTN entity described above in connection with FIG. 2. In some aspects, the transmission component 1004 may be co-located with the reception component 1002 in a transceiver.

The transmission component 1004 may transmit, to a UE, a message that is associated with an uplink grant. The selection component 1008 may select, based at least in part on the message, either a cell-specific offset or an updated offset that is indicated after initial access, as a timing offset that accounts for a propagation delay between a base station of the NTN and the UE. The reception component 1002 may receive, from the UE via the NTN entity, an uplink communication using the timing offset.

The transmission component 1004 may transmit a MAC-CE or RRC message that includes an indication of whether to select the cell-specific offset or the updated offset, and the selection component 1008 may select, as the timing offset, either the cell-specific offset or the updated offset based at least in part on the indication in the MAC-CE or RRC message.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some Aspects of the present disclosure:

Aspect 1: A method of wireless communication performed by a user equipment (UE), comprising: receiving, from a non-terrestrial network (NTN) entity, a message that is associated with an uplink grant; selecting, based at least in part on the message, either a cell-specific offset or an updated offset that is indicated after initial access, as a timing offset that accounts for a propagation delay between a base station of the NTN and the UE; and transmitting, to the NTN entity, an uplink communication using the timing offset.

Aspect 2: The method of Aspect 1, wherein the updated offset is a UE-specific offset.

Aspect 3: The method of Aspect 1, wherein the updated offset is a UE group-specific offset.

Aspect 4: The method of Aspect 1, wherein the updated offset is a beam-specific offset.

Aspect 5: The method of any of Aspects 1-4, wherein the updated offset is an update over the cell-specific offset.

Aspect 6: The method of any of Aspects 1-5, wherein a duration of the updated offset is shorter than a duration of the cell-specific offset.

Aspect 7: The method of any of Aspects 1-6, wherein the updated offset is selected as the timing offset if a resource allocation is indicated in a message other than downlink control information.

Aspect 8: The method of any of Aspects 1-6, wherein the message includes downlink control information (DCI) associated with a cyclic redundancy check (CRC) that is scrambled with a radio network temporary identifier (RNTI), and wherein the timing offset is selected based at least in part on a type of the RNTI.

Aspect 9: The method of Aspect 8, wherein the cell-specific offset is selected as the timing offset if the CRC of the DCI is scrambled with an RNTI that is not UE-specific.

Aspect 10: The method of Aspect 8, wherein the updated offset is selected if the CRC of the DCI is scrambled with an RNTI that is UE-specific.

Aspect 11: The method of Aspect 8, wherein the cell-specific offset is selected if the CRC of the DCI is scrambled with an RNTI that is UE-specific and the DCI indicates a physical downlink control channel order.

Aspect 12: The method of any of Aspects 1-11, wherein selecting the timing offset includes selecting the cell-specific offset if the UE is performing one or more of initial access or random access.

Aspect 13: The method of any of Aspects 1-12, wherein selecting the timing offset includes selecting the updated offset if the UE is to transmit, in association with the message, hybrid automatic repeat request feedback or a physical uplink shared channel communication.

Aspect 14: The method of any of Aspects 1-13, wherein the message includes DCI and selecting the timing offset includes selecting either the cell-specific offset or the updated offset based at least in part on an indication in the DCI of whether to select the cell-specific offset or the updated offset.

Aspect 15: The method of any of Aspects 1-14, further comprising receiving a medium access control control element (MAC-CE) or radio resource control (RRC) message that includes an indication of whether to select the cell-specific offset or the updated offset, and wherein selecting the timing offset includes selecting either the cell-specific offset or the updated offset based at least in part on the indication in the MAC-CE or RRC message.

Aspect 16: The method of any of Aspects 1-15, wherein selecting the timing offset includes selecting the cell-specific offset if the uplink communication is an initial Msg3 transmission.

Aspect 17: The method of any of Aspects 1-15, wherein selecting the timing offset includes selecting the cell-specific offset if the uplink communication is a Msg3 retransmission scheduled by downlink control information with a cyclic redundancy check that is scrambled by a temporary cell radio network temporary identifier.

Aspect 18: The method of any of Aspects 1-15, wherein selecting the timing offset includes selecting the cell-specific offset if the uplink communication is a hybrid automatic repeat request acknowledgement in response to a Msg4 transmission scheduled by downlink control information with a cyclic redundancy check that is scrambled by a temporary cell radio network temporary identifier.

Aspect 19: The method of any of Aspects 1-15, wherein selecting the timing offset includes selecting the cell-specific offset if the uplink communication is a HARQ ACK in response to a MsgB transmission scheduled by downlink control information with a cyclic redundancy check that is scrambled by a MsgB radio network temporary identifier.

Aspect 20: A method of wireless communication performed by a base station of a non-terrestrial network (NTN), comprising: transmitting, to a user equipment (UE) via an NTN entity, a message that is associated with an uplink grant; selecting, based at least in part on the message, either a cell-specific offset or an updated offset whose value is indicated after initial access, as a timing offset that accounts for a propagation delay between the base station and the UE; and receiving, from the UE via the NTN entity, an uplink communication using the timing offset.

Aspect 21: The method of Aspect 20, wherein the updated offset is a UE-specific offset.

Aspect 22: The method of Aspect 20, wherein the updated offset is a UE group-specific offset.

Aspect 23: The method of Aspect 20, wherein the updated offset is a beam-specific offset.

Aspect 24: The method of any of Aspects 20-23, wherein the updated offset is selected as the timing offset if a resource allocation is indicated in downlink control information.

Aspect 25: The method of any of Aspects 20-24, wherein the message includes downlink control information (DCI) that is scrambled with a radio network temporary identifier (RNTI), and wherein the timing offset is selected based at least in part on a type of the RNTI.

Aspect 26: The method of Aspect 25, wherein the cell-specific offset is selected as the timing offset if the DCI is scrambled with an RNTI that is not UE-specific.

Aspect 27: The method of Aspect 25, wherein the updated offset is selected if the DCI is scrambled with an RNTI that is UE-specific.

Aspect 28: The method of Aspect 25, wherein the cell-specific offset is selected if the DCI is scrambled with an RNTI that is UE-specific and the DCI indicates a physical downlink control channel order.

Aspect 29: The method of any of Aspects 20-28, wherein selecting the timing offset includes selecting the cell-specific offset if the UE is performing one or more of initial access or random access.

Aspect 30: The method of any of Aspects 20-29, wherein selecting the timing offset includes selecting the updated offset if the UE is to transmit, in association with the message, hybrid automatic repeat request feedback or a physical uplink shared channel communication.

Aspect 31: The method of any of Aspects 20-30, wherein the message includes DCI and selecting the timing offset includes selecting either the cell-specific offset or the updated offset based at least in part on an indication in the DCI of whether to select the cell-specific offset or the updated offset.

Aspect 32: The method of Aspect 31, further comprising transmitting a medium access control control element (MAC-CE) or radio resource control (RRC) message that includes an indication of whether to select the cell-specific offset or the updated offset, and wherein selecting the timing offset includes selecting either the cell-specific offset or the updated offset based at least in part on the indication in the MAC-CE or RRC message.

Aspect 33: The method of any of Aspects 20-26, wherein selecting the timing offset includes selecting the cell-specific offset if the uplink communication is a Msg3 transmission or a Msg3 retransmission with scrambling initialized by a radio network temporary identifier that is not UE specific.

Aspect 34: An apparatus for wireless communication at a device, comprising a processor; memory coupled with the processor; and instructions stored in the memory and executable by the processor to cause the apparatus to perform the method of one or more of Aspects 1-33.

Aspect 35: A device for wireless communication, comprising a memory and one or more processors coupled to the memory, the memory and the one or more processors configured to perform the method of one or more of Aspects 1-33.

Aspect 36: An apparatus for wireless communication, comprising at least one means for performing the method of one or more of Aspects 1-33.

Aspect 37: A non-transitory computer-readable medium storing code for wireless communication, the code comprising instructions executable by a processor to perform the method of one or more of Aspects 1-33.

Aspect 38: A non-transitory computer-readable medium storing a set of instructions for wireless communication, the set of instructions comprising one or more instructions that, when executed by one or more processors of a device, cause the device to perform the method of one or more of Aspects 1-33.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network entity for wireless communication, comprising:
    one or more memories; and
    one or more processors, coupled to the one or more memories, configured to:
        transmit a message, comprising downlink control information (DCI) that is scrambled with a type of radio network temporary identifier (RNTI); and
        receive, from a user equipment (UE), using a cell-specific timing offset based at least in part on the type of RNTI, hybrid automatic repeat request (HARQ) feedback in association with one or more of initial access or random access, wherein the cell-specific timing offset is included in a previously transmitted message and the cell-specific timing offset accounts for a propagation delay between the network entity, of a non-terrestrial network (NTN), and the UE.

2. The network entity of claim 1, wherein the previously transmitted message comprises a system information block.

3. The network entity of claim 2, wherein the one or more processors are further to:
    transmit the system information block in a broadcast message within a cell associated with the UE.

4. The network entity of claim 1, wherein the one or more processors are configured to transmit an indication of an updated timing offset.

5. The network entity of claim 4, wherein the updated timing offset is a UE-specific timing offset.

6. The network entity of claim 4, wherein the updated timing offset is an update over the cell-specific timing offset.

7. The network entity of claim 4, wherein a duration of the updated timing offset is shorter than a duration of the cell-specific timing offset.

8. The network entity of claim 1, wherein the type of RNTI is a MsgB-RNTI.

9. The network entity of claim 1, wherein the one or more processors are configured to receive a physical uplink shared channel (PUSCH) communication using a UE-specific timing offset based at least in part on transmitting downlink control information that does not include a resource allocation.

10. The network entity of claim 1, wherein the previously transmitted message comprises the DCI.

11. The network entity of claim 1, wherein the previously transmitted message comprises a radio resource control message.

12. The network entity of claim 1, wherein the previously transmitted message comprises a medium access-control (MAC) control element (CE) message.

13. A network entity for wireless communication, comprising:
    one or more memories; and
    one or more processors, coupled to the one or more memories, configured to:
        transmit a message, to a user equipment (UE), comprising downlink control information (DCI) that is scrambled with a type of radio network temporary identifier (RNTI); and
        receive, from the UE, using a cell-specific timing offset based at least in part on the type of RNTI, a physical uplink shared channel (PUSCH) communication in association with one or more of initial access or random access, wherein the cell-specific timing offset is included in a previously transmitted message and the cell-specific timing offset accounts for a propagation delay between the network entity, of a non-terrestrial network (NTN) and the UE.

14. The network entity of claim 13, wherein the previously transmitted message comprises a system information block.

15. The network entity of claim 14, wherein the one or more processors are further to:
    transmit the system information block in a broadcast message within a cell associated with the UE.

16. The network entity of claim 13, wherein the one or more processors are configured to transmit an indication of an updated timing offset.

17. The network entity of claim 16, wherein the updated timing offset is a UE-specific timing offset.

18. The network entity of claim 16, wherein the updated timing offset is an update over the cell-specific timing offset.

19. The network entity of claim 16, wherein a duration of the updated timing offset is shorter than a duration of the cell-specific timing offset.

20. The network entity of claim 13, wherein the type of RNTI is a MsgB-RNTI.

21. The network entity of claim 13, wherein the one or more processors are configured to receive a physical uplink shared channel (PUSCH) communication using a UE-specific timing offset based at least in part on transmitting downlink control information that does not include a resource allocation.

22. The network entity of claim 13, wherein the previously transmitted message comprises the DCI.

23. The network entity of claim 13, wherein the previously transmitted message comprises a radio resource control message.

24. The network entity of claim 13, wherein the previously transmitted message comprises a medium access-control (MAC) control element (CE) message.

25. A method of wireless communication performed by a network entity, comprising:

transmitting a message, comprising downlink control information (DCI) that is scrambled with a type of radio network temporary identifier (RNTI); and receiving, from a user equipment (UE), using a cell-specific timing offset based at least in part on the type of RNTI, hybrid automatic repeat request (HARQ) feedback in association with one or more of initial access or random access, wherein the cell-specific timing offset is included in a previously transmitted message and the cell-specific timing offset accounts for a propagation delay between the network entity, of a non-terrestrial network (NTN), and the UE.

26. The method of claim 25, wherein the previously transmitted message comprises a system information block.

27. The method of claim 26, further comprising transmitting the system information block in a broadcast message within a cell associated with the UE.

28. The method of claim 25, wherein the type of RNTI is a MsgB-RNTI.

29. A method of wireless communication performed by a network entity, comprising:

transmitting a message, to a user equipment (UE), comprising downlink control information (DCI) that is scrambled with a type of radio network temporary identifier (RNTI); and receiving, from the UE, using a cell-specific timing offset based at least in part on the type of RNTI, a physical uplink shared channel (PUSCH) communication in association with one or more of initial access or random access, wherein the cell-specific timing offset is included in a previously transmitted message and the cell-specific timing offset accounts for a propagation delay between the network entity, of a non-terrestrial network (NTN) and the UE.

30. The method of claim 29, wherein the previously transmitted message comprises a system information block.

* * * * *